United States Patent
Yamaura

(10) Patent No.: US 11,121,393 B2
(45) Date of Patent: Sep. 14, 2021

(54) MANIFOLD AND METHOD FOR MANUFACTURING MANIFOLD

(71) Applicant: TOYOTA BOSHOKU KABUSHIKI KAISHA, Aichi (JP)

(72) Inventor: Kunihiro Yamaura, Tokai (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 0 days.

(21) Appl. No.: 15/921,285

(22) Filed: Mar. 14, 2018

(65) Prior Publication Data

US 2018/0277879 A1    Sep. 27, 2018

(30) Foreign Application Priority Data

Mar. 27, 2017 (JP) .............................. JP2017-060856

(51) Int. Cl.
*H01M 8/2484* (2016.01)
*H01M 8/04029* (2016.01)
*H01M 8/04082* (2016.01)
*H01M 8/2457* (2016.01)

(52) U.S. Cl.
CPC ..... *H01M 8/2484* (2016.02); *H01M 8/04029* (2013.01); *H01M 8/04201* (2013.01); *H01M 8/2457* (2016.02); *H01M 2250/20* (2013.01); *Y02P 70/50* (2015.11)

(58) Field of Classification Search
CPC ......... H01M 2250/20; H01M 8/04201; H01M 8/2457; H01M 8/2484; H01M 8/04029; Y02P 70/50
See application file for complete search history.

(56) References Cited

U.S. PATENT DOCUMENTS

| | | | | |
|---|---|---|---|---|
| 2003/0215695 | A1* | 11/2003 | Suzuki | H01M 8/0254 429/434 |
| 2010/0190068 | A1* | 7/2010 | Miyajima | H01M 8/02 429/413 |
| 2013/0017468 | A1* | 1/2013 | Kim | H01M 8/2465 429/452 |

FOREIGN PATENT DOCUMENTS

| | | |
|---|---|---|
| CA | 2909887 | 5/2016 |
| JP | 2015008086 A * | 1/2015 |
| JP | 2016-095900 | 5/2016 |
| JP | 2016-134335 | 7/2016 |

OTHER PUBLICATIONS

Machine translation of Japanese Patent Publication No. 2015-008086, published Jan. 15, 2015. (Year: 2015).*
Machine translation of Japanese Patent Publication JP 2016-134335, published Jul. 25, 2016. (Year: 2016).*
Japanese Office Action in counterpart Application No. JP 2017-060856, dated Aug. 4, 2020 (and English translation thereof).

* cited by examiner

*Primary Examiner* — Miriam Stagg
*Assistant Examiner* — Lilia Nedialkova
(74) *Attorney, Agent, or Firm* — Greenblum & Bernstein, P.L.C.

(57) ABSTRACT

A manifold includes an end plate having a flat surface and a plastic layer. A hole for forming a flow path is opened in the flat surface. The plastic layer covers the flat surface and the inner surface of the hole. An inclined surface is formed on the inner circumferential surface of the open end of the hole that is located on the flat surface. The inclined surface has a straight cross section inclined relative to the center line of the hole.

4 Claims, 4 Drawing Sheets

MANIFOLD AND METHOD FOR MANUFACTURING MANIFOLD

BACKGROUND

The present invention relates to a manifold and a method for manufacturing a manifold.

The fuel cell mounted on a vehicle such as an automobile is equipped with a manifold for causing fluid such as fuel gas, oxidation gas, and cooling water to flow through the cell stack of the fuel cell. The fuel cell is cooled by coolant supplied to and discharged from the cell stack via the manifold, while generating power using fuel gas and oxidation gas supplied to and discharged from the cell stack via the manifold.

The fuel cell includes a case, which is provided to surround the cell stack. The manifold has a metal end plate attached to the case of the fuel cell. The end plate has a mounting surface, which is brought into contact with and fixed to the case, a hole for forming a flow path through which the fluid flows, and a flat surface in which the hole opens. Furthermore, the flat surface and the inner surface of the hole are covered by a plastic layer.

When the end plate is brought into contact with and fixed to the case, the portion of the plastic layer that covers the flat surface contacts the end in the cell stacking direction of the cell stack. In this case, the cell stack is pressed in the cell stacking direction by the flat surface. This maintains a favorable cell stacking structure of the cell stack. At this time, the flow path formed by the hole, the inner surface of which is covered by the plastic layer, is connected to the cell stack. The fluid in the flow path and the end plate are insulated from each other by the portion of the plastic layer that covers the inner surface of the hole. Also, the end plate and the cell stack are insulated from each other by the portion of the plastic layer that covers the flat surface.

In manufacturing the manifold, the cast end plate is cut to form the flat surface. Thereafter, the plastic layer is formed through insert molding. The formation of the above-mentioned flat surface on the end plate is performed with high accuracy such that the distance between the flat surface and the mounting surface becomes a predetermined optimum value. This is because when the mounting surface of the end plate is fixed to the case of the fuel cell, the distance between the above-mentioned flat surface and the mounting surface influences the manner in which the flat surface presses the cell stack in the cell stacking direction.

In a cell stack, the shrinkage factor of the plastic layer is greater than that of the metal end plate when the temperature drops from a high temperature. Therefore, in the portion of the plastic layer that covers the inner surface of the hole, shrinkage toward the central portion in the direction along the center line of the hole occurs as the temperature drops. In contrast, in the portion of the plastic layer that covers the flat surface of the end plate, the displacement toward the central portion is stopped by the flat surface. As a result, in the boundary region between the portion of the plastic layer that covers the inner surface of the hole and the portion of the plastic layer that covers the flat surface of the end plate, a stress concentration occurs due to the difference in shrinkage factor between the end plate and the plastic layer at the time of temperature drop in the portion along the intersection of the flat surface and the inner surface of the hole.

Then, as the temperature repeatedly rises and drops in the manifold, a stress concentration repeatedly occurs in the portion along the intersection of the flat surface and the inner surface of the hole in the boundary region between the portion of the plastic layer that covers the inner surface of the hole and the portion of the plastic layer that covers the flat surface of the end plate. This may cause a crack of the plastic layer in the intersection. In order to deal with such a problem, Japanese Laid-Open Patent Publication No. 2016-95900 discloses the configuration shown in FIG. 5, in which the inner circumferential surface 52a at the open end of a hole 52 in an end plate 51 is formed in an arcuate shape, so that the occurrence of stress concentration as described above is suppressed. For example, suppose that the end plate 51 is cut to form a flat surface as indicated, for example, by the long dashed double-short dashed line L1. In this case, in the boundary region between the portion of the plastic layer that covers the inner surface of the hole 52 and the portion of the plastic layer that covers the flat surface of the end plate 51, the stress concentration caused by a temperature drop of the manifold at the portion along the intersection of the flat surface and the inner surface of the hole 52 (the inner circumferential surface 52a) is suppressed.

When forming the flat surface by cutting the cast end plate 51, the flat surface is formed such that the distance from the mounting surface in the direction along the center line of the hole 52 becomes the optimum value. This may vary the position of the flat surface due to variations of the shape of the end plate 51 during casting and the like. For example, the position of the flat surface in the direction along the center line of the hole 52 is not necessarily the position indicated by the long dashed double-short dashed line L1, but may be a different position (for example, the position indicated by the long dashed double-short dashed line L2).

If the position (L1, L2, or the like) of the flat surface in the direction along the center line of the hole 52 changes, the manner of intersection of the flat surface and the inner circumferential surface 52a of the hole 52 also changes. Thus, when a plastic layer covering the flat surface of the end plate 51 and the inner surface of the hole 52 is formed, the shape of the portion along the intersection of the flat surface and the inner surface of the hole 52 (the inner circumferential surface 52a) in the boundary region between the portion of the plastic layer that covers the flat surface and the portion of the plastic layer that covers the inner surface of the hole 52 changes depending on the state of the intersection of the flat surface and the inner circumferential surface 52a.

Therefore, when the temperature of the manifold drops, variations occur in the stress concentration in the portion along the intersection of the flat surface and the inner circumferential surface 52a in the boundary region in the plastic layer. If the stress concentration in the portion varies to deteriorate, the plastic layer may crack at the above portion as the temperature repeatedly rises and drops in the manifold.

SUMMARY

Accordingly, it is an objective of the present invention to provide a manifold and a method for manufacturing a manifold that are capable of preventing cracking of a portion along an intersection of a flat surface and an inner surface of a hole in the boundary region between the portion of a plastic layer that covers the inner surface of the hole and the portion of the plastic layer that covers the flat surface of the end plate.

Means and operational advantages for solving the above-described problem will now be described.

To achieve the foregoing objective, a manifold is provided that includes an end plate having a flat surface and a plastic layer. A hole for forming a flow path is opened in the flat surface. The plastic layer covers the flat surface and an inner surface of the hole. An inclined surface is formed on an inner circumferential surface of an open end of the hole that is located on the flat surface. The inclined surface has a straight cross section inclined relative to a center line of the hole.

To achieve the foregoing objectives, a method for manufacturing a manifold is provided that includes: preparing an end plate that has a mounting surface configured to be fixed to a case and a hole for forming a flow path; forming, on an inner circumferential surface of an open end of the hole, an inclined surface having a straight cross section inclined relative to a center line of the hole; forming a flat surface by cutting, in a direction perpendicular to the center line, a portion of the end plate that is on a side on which the open end of the hole is provided; and forming a plastic layer such that the plastic layer covers the flat surface and an inner surface of the hole.

DETAILED DESCRIPTION OF THE PREFERRED EMBODIMENTS

A manifold and a method for manufacturing a manifold according to one embodiment will now be described with reference to FIGS. 1 to 4.

Figure 1:
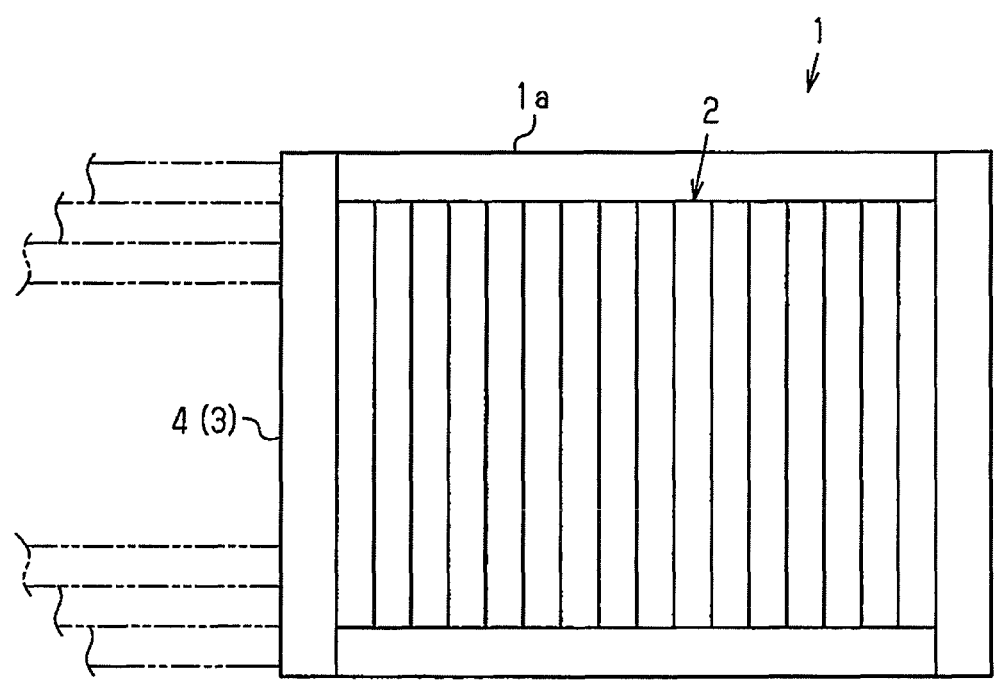
FIG. 1 is a schematic diagram illustrating a manner in which a manifold (end plate) is attached to the cell stack of a fuel cell.

As shown in FIG. 1, a fuel cell 1 includes a case 1a and a cell stack 2. The case 1a is provided so as to surround the cell stack 2. The fuel cell 1 includes a manifold 3, which is located at an end in the cell stacking direction of the cell stack 2 (the left-right direction in FIG. 1). The manifold 3 is used to cause fluid such as hydrogen (fuel gas), air (oxidation gas), and cooling water (coolant) to flow through the cell stack 2. The manifold 3 has a metal end plate 4 attached to the case 1a. The cell stack 2 uses the hydrogen and air supplied and discharged through the manifold 3 to generate power and is cooled by the cooling water supplied and discharged through the manifold 3.

Figure 2:
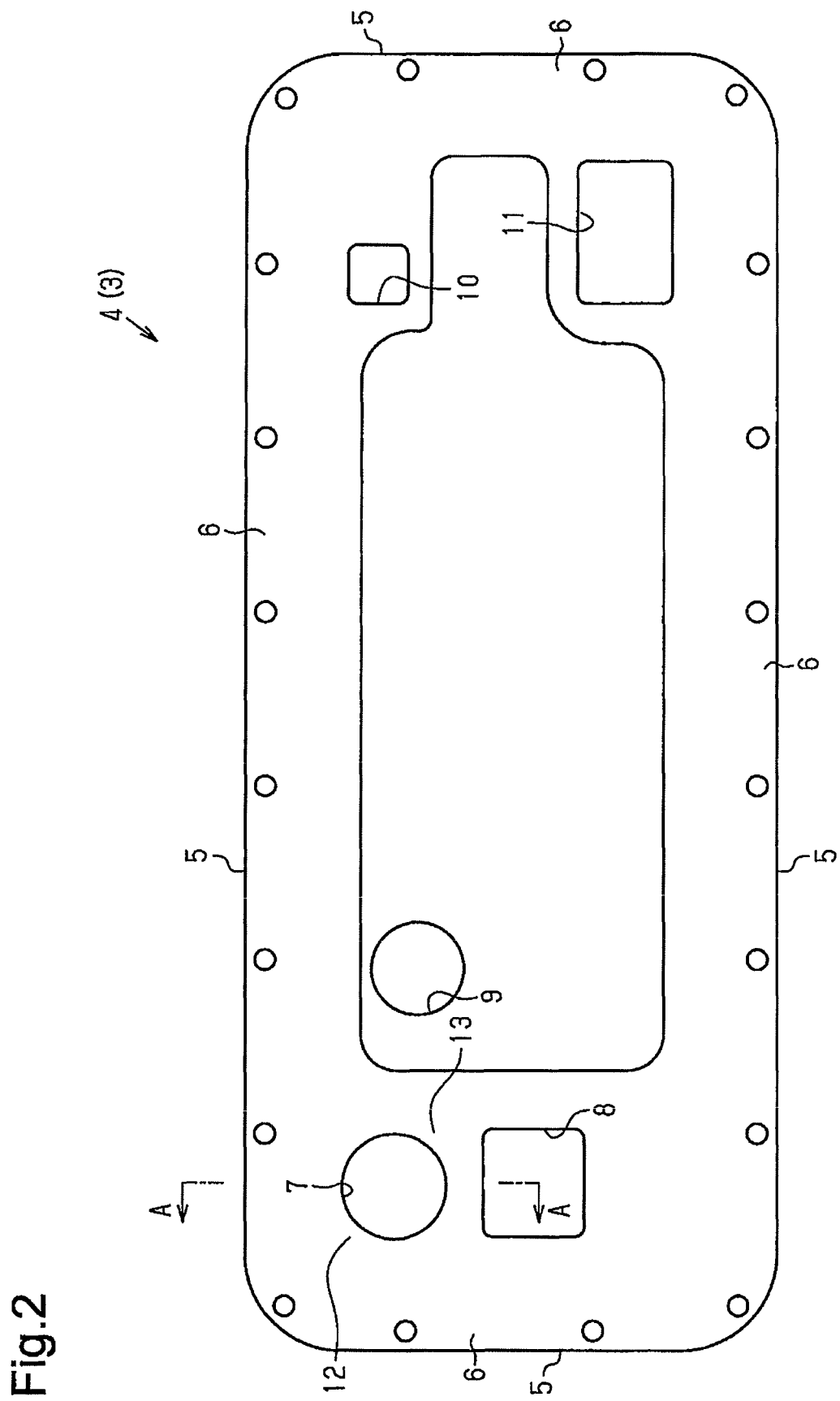
FIG. 2 is a schematic plan view of the manifold of FIG. 1, as viewed from the cell stack.

FIG. 2 schematically shows a state of the manifold 3 (the end plate 4) of FIG. 1 as seen from the cell stack 2. The end plate 4 is shaped as a rectangular plate having a pair of long sides and a pair of short sides. The end plate 4 has on the outer periphery a fastening portion 5 extending along the long sides and the short sides. The fastening portion 5 is fastened to the case 1a (FIG. 1), for example, with bolts. The surface of the fastening portion 5 on the side facing the cell stack 2 (the surface on the near side of the sheet of FIG. 2) constitutes a mounting surface 6, which is brought into contact with and fixed to the case 1a.

The end plate 4 has holes 7 to 11 in a part surrounded by the fastening portion 5. The holes 7 to 11 extend through the end plate 4 in the thickness direction (the direction orthogonal to the sheet of FIG. 2). The holes 7 to 11 are used to form flow paths. The holes 7, 8, 10, and 11 are open in a flat surface 12 of the end plate 4, which faces the cell stack 2. The inner surfaces of the holes 7 to 11 and the surface of the end plate 4 that faces the cell stack 2 (including the flat surface 12) are covered by the plastic layer 13.

When the end plate 4 is fixed with the mounting surface 6 brought into contact with the case 1a (FIG. 1), the portion of the plastic layer 13 that covers the flat surface 12 contacts the end in the cell stacking direction of the cell stack 2. In this case, the cell stack 2 is pressed in the cell stacking direction by the end plate 4 (the flat surface 12). This maintains a favorable cell stacking structure of the cell stack 2. At this time, the flow paths formed by the holes 7 to 11 are connected to the cell stack 2. The fluid in the flow paths and the end plate 4 are insulated from each other by the portions of the plastic layer 13 that cover the inner surfaces of the holes 7 to 11. Also, the end plate 4 and the cell stack 2 are insulated from each other by the portion of the plastic layer 13 that covers the flat surface 12.

Figure 3:
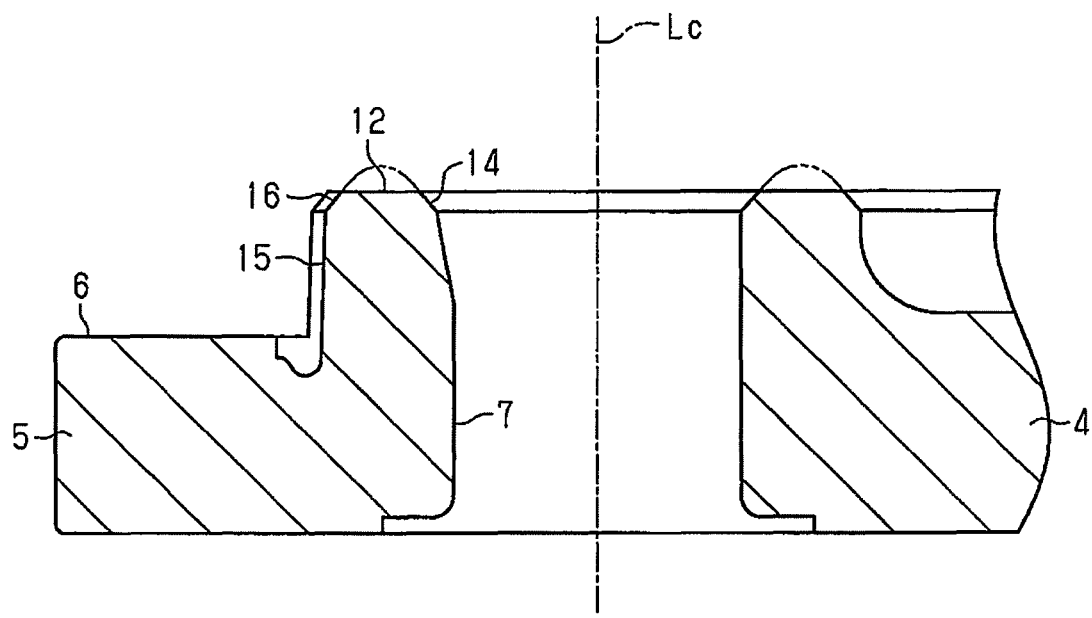
FIG. 3 is a cross-sectional view taken along line A-A of the end plate shown in FIG. 2.
Figure 4:
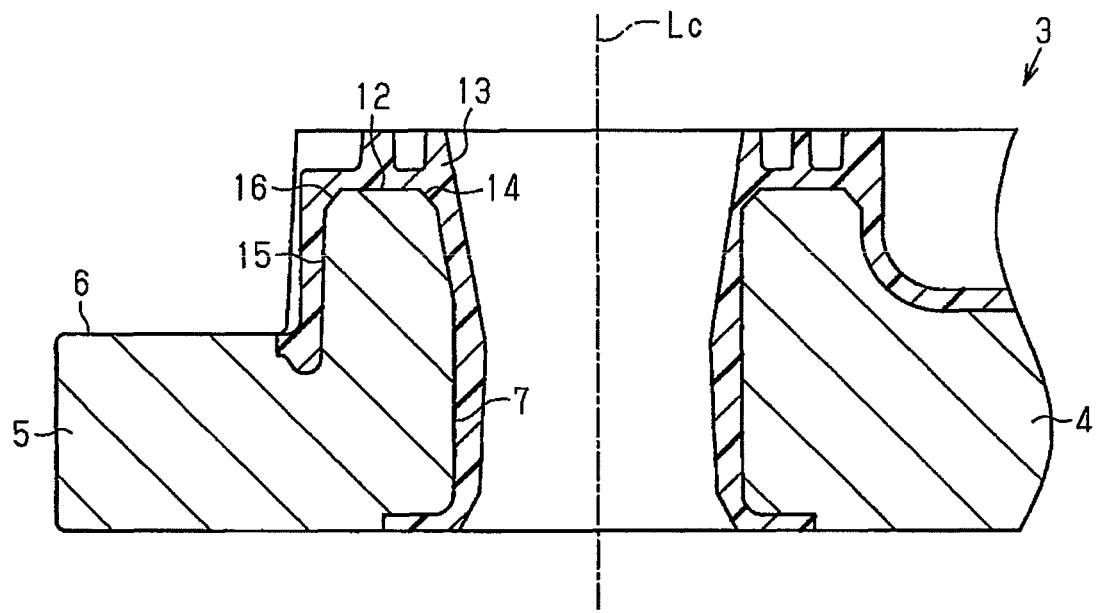
FIG. 4 is a cross-sectional view taken along line A-A of the end plate and the plastic layer shown in FIG. 2.
Figure 5:
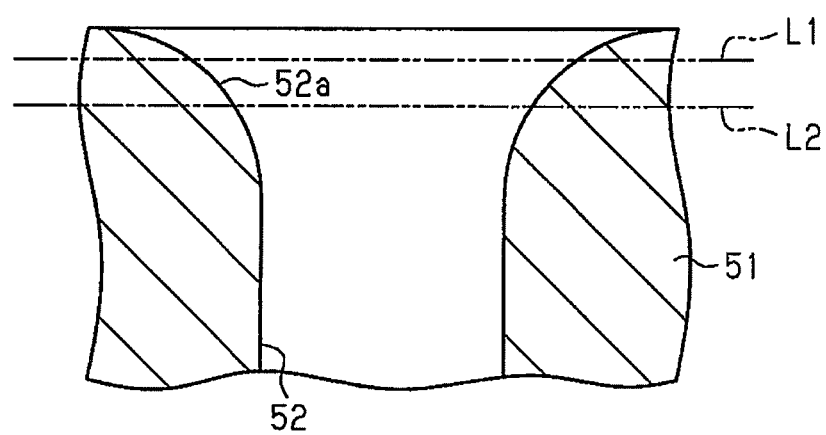
FIG. 5 is a cross-sectional view illustrating a way in which a flat surface is formed in the end plate of a conventional manifold.

FIGS. 3 and 4 are cross-sectional views of the portion about the hole 7 of the manifold 3 shown in FIG. 2, as seen in the direction of the arrows A-A. FIG. 3 shows only the end plate 4. FIG. 4 shows the end plate 4 and the plastic layer 13.

The flat surface 12 of the end plate 4 is separated from the mounting surface 6 of the fastening portion 5 in the thickness direction of the end plate 4 (in this example, upward as viewed in FIGS. 3 and 4). The distance between the mounting surface 6 and the flat surface 12 in the direction along the center line of the hole 7 influences the manner in which the flat surface 12 presses the cell stack 2 in the cell stacking direction when the mounting surface 6 of the end plate 4 is fixed to the case 1a of the fuel cell 1 (FIG. 1). Therefore, the end plate 4 is formed by a casting method such as a die casting method. Thereafter, the flat surface 12 is formed with high accuracy through cutting such that the above-described distance becomes a predetermined optimum value.

A first inclined surface 14 is formed on the inner circumferential surface of the open end of the hole 7 located on the flat surface 12. The first inclined surface 14 has a straight cross section inclined relative to the center line Lc of the hole 7. A step 15 exists between the flat surface 12 and the mounting surface 6. At the intersection of the step 15 and the flat surface 12, a second inclined surface 16 having a straight cross section inclined relative to the center line Lc of the hole 7 is formed. The plastic layer 13 described above not only covers the flat surface 12 and the inner surface of the hole 7, but also covers the step 15.

When the temperature of the cell stack 2 drops from a high temperature, a stress concentration occurs due to the difference in shrinkage factor between the end plate 4 and the plastic layer 13 in a portion along the intersection of the flat surface 12 and the inner surface of the hole 7 in the boundary region between the portion of the plastic layer 13 that covers the inner surface of the hole 7 and the portion of the plastic layer 13 that covers the flat surface 12 of the end plate 4. A stress concentration also occurs in the portion along the intersection of the step 15 and flat surface 12 in the boundary region between the portion of the plastic layer 13 that covers the step 15 and the portion of the plastic layer 13 that covers the flat surface 12 of the end plate 4.

Specifically, when the temperature of the cell stack 2 drops from a high temperature, the shrinkage factor of the plastic layer 13 becomes greater than the shrinkage factor of the metal end plate 4. Therefore, in the portion of the plastic layer 13 that covers the inner surface of the hole 7, shrinkage toward the central portion in the direction along the center line of the hole 7 occurs as the temperature drops. In addition, as the temperature drops, contraction in a direction away from the flat surface 12 occurs in the portion of the plastic layer 13 that covers the step 15. On the other hand, in the portion of the plastic layer 13 that covers the flat surface 12 of the end plate 4, the flat surface 12 limits the displacement toward the central portion, that is, the displacement in a direction away from the flat surface 12. As a result, when the temperature of the manifold 3 drops, a stress concentration occurs in a portion along the intersection of the flat surface 12 and the inner surface of the hole 7 in the boundary region between the portion of the plastic layer 13 that covers the inner surface of the hole 7 and the portion of the plastic layer 13 that covers the flat surface 12 of the end plate 4. Further, the stress concentration occurs in the portion along the intersection of the step 15 and flat surface 12 in the boundary region between the portion of the plastic layer 13 that covers the step 15 and the portion of the plastic layer 13 that covers the flat surface 12 of the end plate 4.

The inclination angle of the first inclined surface 14 relative to the center line Lc influences the stress that occurs in a portion along the intersection of the flat surface 12 and the inner surface of the hole 7 in the boundary region between the portion of the plastic layer 13 that covers the inner surface of the hole 7 and the portion of the plastic layer 13 that covers the flat surface 12 of the end plate 4. Furthermore, the inclination angle of the first inclined surface 14 relative to the center line Lc also influences the area of the flat surface 12. Therefore, in consideration of these influences, the inclination angle of the first inclined surface 14 is set to a value appropriately adjusted with, for example, 45° as a reference value. The inclination angle of the second inclined surface 16 relative to the center line Lc influences the stress that occurs in a portion along the intersection of the step 15 and the flat surface 12 in the boundary region between the portion of the plastic layer 13 that covers the step 15 and the portion of the plastic layer 13 that covers the flat surface 12 of the end plate 4. Furthermore, the inclination angle of the second inclined surface 16 relative to the center line Lc also influences the area of the flat surface 12. Therefore, in consideration of these influences, the inclination angle of the second inclined surface 16 is set to a value appropriately adjusted with, for example, 45° as a reference value.

The structures of the holes 8, 10, 11, and their surroundings in the end plate 4 shown in FIG. 2 are similar to those of the hole 7 and its surroundings.

A method for manufacturing the manifold 3 will now be described.

When manufacturing the above-described manifold, an end plate 4 is first formed by a casting method such as a die casting method. Immediately after being cast, the end plate 4 does not have the flat surface 12 but has the shape indicated by the long dashed double-short dashed line in FIG. 3. Also, the first and second inclined surfaces 14, 16 are formed in the end plate 4 through casting. Then, the flat surface 12 is formed by cutting the cast end plate 4 to remove the portion indicated by the long dashed double-short dashed line in FIG. 3. The formation of the flat surface 12 through cutting at this time is performed such that the distance between the mounting surface 6 and the flat surface 12 in the direction along the center line of the hole 7 becomes the optimum value. Then, after the flat surface 12 is formed on the end plate 4 through cutting, the plastic layer 13 is formed through insert molding so as to cover the flat surface 12, the inner surface of the hole 7, and the step 15 as shown in FIG. 4.

The operation and advantages of the manifold 3 and the method for manufacturing the manifold 3 of the present embodiment will now be described.

(1) The flat surface 12 is formed by cutting the cast end plate 4. At this time, when the flat surface 12 is formed such that the distance from the mounting surface 6 in the direction along the center line of the hole 7 becomes the optimum value, the position of the flat surface 12 at that time may be changed due to variations of the shape of the end plate 4 or the like. Even if the position of the flat surface 12 changes in the direction along the center line of the hole 7, the manner in which the flat surface 12 intersects with the first and second inclined surfaces 14, 16 remains unchanged since the first and second inclined surfaces 14, 16 each have a straight cross section inclined relative to the center line Lc of the hole 7.

Therefore, the shape of the portion along the intersection of the flat surface 12 and the inner surface (the inclined surface 14) of the hole 7 in the boundary region between the portion of the plastic layer 13 that covers the flat surface 12 and the portion of the plastic layer 13 that covers the inner surface of the hole 7 is constant irrespective of the position of the flat surface 12 in the direction along the center line of the hole 7. This prevents stress concentration at the portion along the intersection of the flat surface 12 and the inclined surface 14 in the boundary region between the portion of the plastic layer 13 that covers the flat surface 12 and the portion of the plastic layer 13 that covers the inner surface of the hole 7 from varying in accordance with the position of the flat surface 12 in the direction along the center line of the hole 7 when the temperature of the manifold 3 drops. As a result, it is also possible to prevent the stress concentration in the above-mentioned portion from varying to deteriorate. This prevents the plastic layer 13 from cracking in the portion along the intersection of the flat surface 12 and the inclined surface 14 in the boundary region between the portion of the plastic layer 13 that covers the flat surface 12 and the portion of the plastic layer 13 that covers the inner surface of the hole 7 when the temperature repeatedly rises and drops in the manifold 3.

Further, the shape of the portion along the intersection of the step 15 (the inclined surface 16) and the flat surface 12 in the boundary region between the portion of the plastic layer 13 that covers the step 15 and the portion of the plastic layer 13 that covers the flat surface 12 is constant irrespective of the position of the flat surface 12 in the direction along the center line of the hole 7. This prevents stress concentration at the portion along the intersection of the inclined surface 16 and the flat surface 12 in the boundary region between the portion of the plastic layer 13 that covers the step 15 and the portion of the plastic layer 13 that covers the flat surface 12 from varying in accordance with the position of the flat surface 12 in the direction along the center line of the hole 7 when the temperature of the manifold 3 drops. As a result, it is also possible to prevent the stress concentration in the above-mentioned portion from varying to deteriorate. This prevents the plastic layer 13 from cracking in the portion along the intersection of the second inclined surface 16 and the flat surface 12 in the boundary region between the portion of the plastic layer 13 that covers the step 15 and the portion of the plastic layer 13 that covers the flat surface 12 when the temperature repeatedly rises and drops in the manifold 3.

The above-described embodiments may be modified as follows.

The inclination angles of the first and second inclined surfaces 14, 16 relative to the center line Lc of the hole 7 may be changed as necessary.

In the above-described embodiments, the first and second inclined surfaces 14, 16 are formed at the time of forming the end plate 4 by casting. However, the inclined surfaces 14, 16 may be formed through cutting after forming the end plate 4 by casting.

It is not always necessary to provide the first inclined surface 14 and the second inclined surface 16, but only the first inclined surface 14 may be provided.

The invention claimed is:

1. A manifold comprising:
    an end plate having a flat surface forming a protruding face of the end plate, wherein a hole for forming a flow path is opened at the protruding face of the end plate; and
    a plastic layer, which covers the protruding face of the end plate and an inner surface of the hole, wherein
    the inner surface of the hole includes an inclined surface, the inclined surface extending from the protruding face of the end plate and defines an open end of the hole that is located on the face of the end plate, and
    the inclined surface has a straight cross section inclined relative to a center line of the hole, wherein
    the end plate includes a mounting surface configured to be fixed to a case,
    the flat surface is separated from the mounting surface in a thickness direction of the end plate,
    a step exists between the flat surface and the mounting surface,
    the inclined surface is a first inclined surface,
    a second inclined surface is formed at an intersection of the step and the flat surface, the second inclined surface having a straight cross section inclined relative to the center line of the hole, and
    the plastic layer covers the step,
    wherein the second inclined surface is arranged outside of the hole.

2. A method for manufacturing the manifold of claim 1, the method comprising:
    preparing the end plate that has the mounting surface configured to be fixed to the case and the hole for forming a flow path;
    forming, on an inner circumferential surface of the an open end of the hole, the first inclined surface having the straight cross section inclined relative to the center line of the hole;
    forming the flat surface by cutting, in a direction perpendicular to the center line, a portion of the end plate that is on a side on which the open end of the hole is provided; and
    forming the plastic layer such that the plastic layer covers the flat surface and the inner surface of the hole.

3. The method for manufacturing the manifold according to claim 2, wherein
    the end plate includes the step between the mounting surface and the open end of the hole, and
    the method for manufacturing the manifold further comprises:
    forming, at an end of the step on the side on which the open end of the hole is provided, the second inclined surface having a straight cross section inclined relative to the center line; and
    forming the plastic layer such that the plastic layer covers the flat surface, the inner surface of the hole, and the step.

4. The manifold according to claim 1, wherein the protruding face is an outermost face of the end plate.

* * * * *